United States Patent [19]

Beaujean

[11] Patent Number: 5,048,006
[45] Date of Patent: Sep. 10, 1991

[54] OPTICAL INFORMATION CARRIER HAVING INTERCONNECTED BUFFER SPACES FOR MAINTAINING ITS FLAT SHAPE

[75] Inventor: Joseph M. E. Beaujean, Grubbenvorst, Netherlands

[73] Assignee: Docdata, N.V., Venlo, Netherlands

[21] Appl. No.: 374,998

[22] Filed: Jul. 3, 1989

Related U.S. Application Data

[60] Division of Ser. No. 253,396, Oct. 3, 1988, which is a continuation of Ser. No. 852,039, filed as PCT NL 85/00024 on Jun. 24, 1985 published as WO 86/00459 on Jan. 16, 1986, abandoned.

[30] Foreign Application Priority Data

Jun. 22, 1984 [NL] Netherlands .......................... 8401996

[51] Int. Cl.$^5$ ............................................... G11B 7/24
[52] U.S. Cl. ...................... 369/275.001; 369/275.003; 369/275.004; 369/286; 346/135.1
[58] Field of Search .................. 369/275.1, 284, 275.3, 369/286, 275.4, 288, 279, 100, 109, 111; 346/135.1, 76 L

[56] References Cited

U.S. PATENT DOCUMENTS 4,480,302 10/1984 Kalk et al. ......................... 346/135.1
4,547,876 10/1985 Ettenberg ............................ 369/275

FOREIGN PATENT DOCUMENTS 5888844 5/1988 Japan .

Primary Examiner—Stuart S. Levy
Assistant Examiner—Hoa T. Nguyen
Attorney, Agent, or Firm—Martin Smolowitz

[57] ABSTRACT

Optical information carrier comprising an optically transparent layer and a reflective layer adjacent to each other, and the interface between the layers comprises an optically readable information structure containing alternate areas with such different properties that a scanning light beam is modulated in correspondence with the information present in the structure. In the interface between the optically transparent layer, and the surface of the reflective layer, multiple gas-filled interconnected buffer spaces are provided at positions distributed over the interface, so as to provide for vapor pressure equalization across the carrier structure to maintain its flat shape.

6 Claims, 1 Drawing Sheet

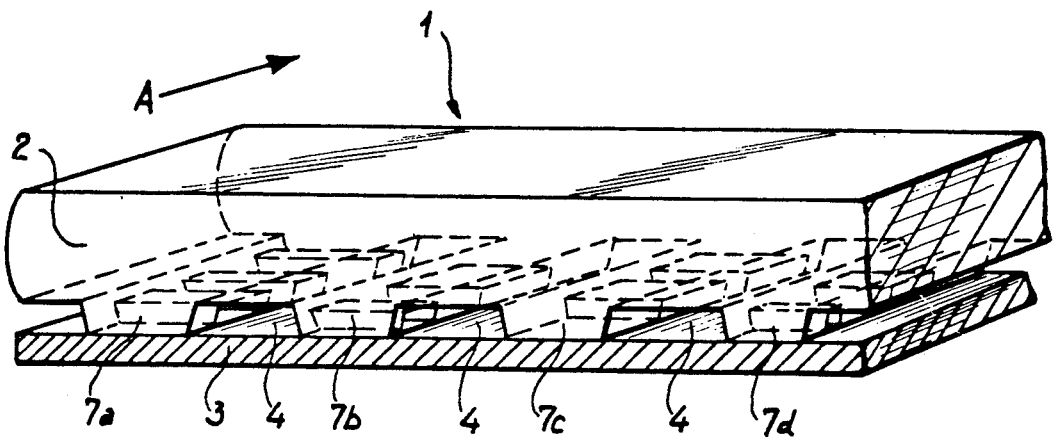
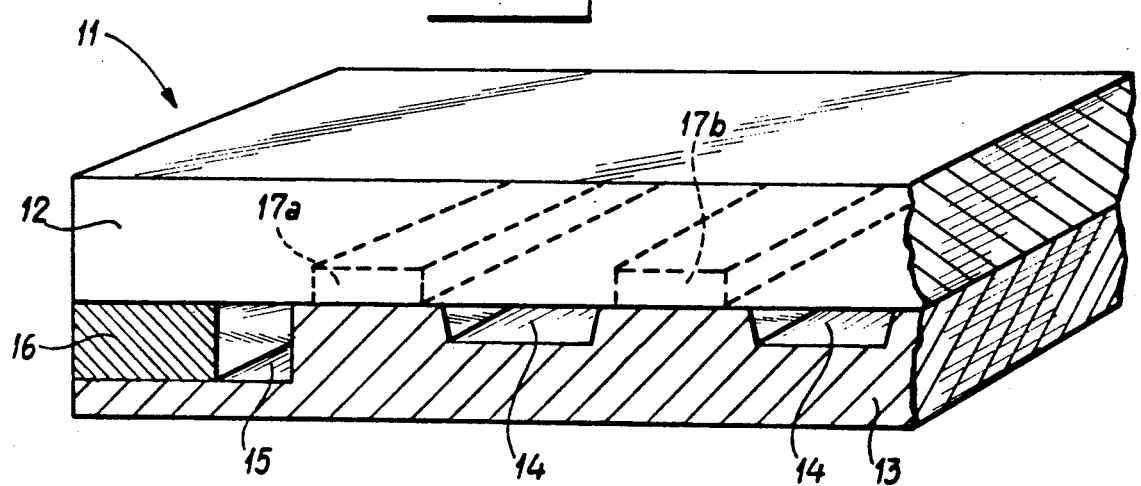
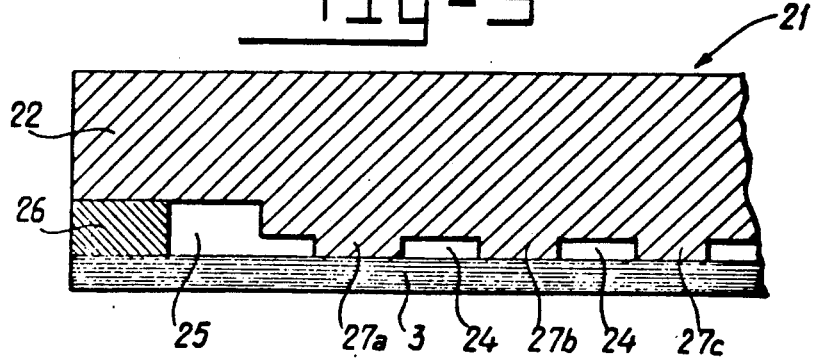

OPTICAL INFORMATION CARRIER HAVING INTERCONNECTED BUFFER SPACES FOR MAINTAINING ITS FLAT SHAPE

CROSS REFERENCE TO RELATED APPLICATION

This is a division of application Ser. No. 253,396 filed Oct. 3, 1988, which is a continuation of Ser. No. 852,039, filed as PCT NL85/00024 on Jun. 24, 1985, published as WO86/00459 on Jan. 16, 1986, now abandoned.

BACKGROUND OF THE INVENTION

The invention relates to an optical information carrier comprising an optically transparent layer and a reflective layer adjacent to each other, and the interface between the two layers comprises an optically readable information structure containing alternate areas with such different properties, that a scanning light beam is modulated in correspondence with the information present in said structure.

Information carriers of this type in a broad sense of the meaning are known for various purposes and in various embodiments. Examples of such information carriers are for instance optical lattice grids, holograms and audio discs or video discs (compact disc).

A general problem with these known optical information carrier structures is the fact that in general gases and vapours, especially water vapour, are able to diffuse into the optical transparent layer but not through the reflective layer. Depending upon the environmental conditions, especially during a reduction of the atmospheric pressure and/or the water vapour concentration, water vapour and/or other gases will diffuse to the outside. At that side of the optical transparent layer directed to the atmosphere there are no obstructions for such a diffusion. However, at the side where the reflective layer is realized, said diffusion causes problems. The reflective layer in most cases consists of metal which does not transmit gases and vapours. In case the vapour pressure at the interface between the optical transparent layer and the reflective layer increases under the influence of environmental conditions, then it is not inconceivable that the adherence between both layers is locally not able to withstand this increase in pressure and will collapse. The result thereof is the development of larger or smaller bubbles or blisters at the interface between both layers. Such blisters form a serious hindrance for the error-free reading of the information present in the carrier structure. Taking into account the sometimes very small dimensions of the information structure, the dimensions on a video disc are in the order of some $\mu m$, the development of even the smallest gas or vapour bubbles in said interface must be prevented.

The presence of a diffusion-tight reflective layer can also result in a distortion of the information carrier as a whole, because the vapour profile of a layer will in general be symmetrical in the direction towards the side edges, assuming that the same atmospheric pressure prevails at both sides and that a free exit and respectively a free penetration of gas and vapour is possible. However, if one side of the layer is closed in a vapour-tight and gastight way, such as with the optical information carrier of the above-mentioned type, then in general an asymmetrical dampness or vapour profile will be developed in the optical information carrier. Such asymmetrical vapour profile causes mechanical tensions in the carrier, which may result in a mechanical distortion of the carrier as a whole, which phenomenon could be indicated by the term "warping". With an optical information carrier, as for instance a compact disc, this warping phenomenon will soon lead to a situation in which the information read-out apparatus is no longer able to read the stored information.

SUMMARY OF INVENTION

The object of the invention is now to embody and provide the above indicated optical information carrier such that, regardless of changes in the environmental conditions, the forming of blisters and the development of mechanical tensions, distortions, etc. in the carrier is prevented.

In agreement with said object, the optical information carrier of the above-mentioned type is characterized in that one or more gas-filled buffer spaces are provided on the interface between the surface of the optically transparent layer and the surface of the reflecting layer of the carrier at various positions.

The effect of the distributed buffer spaces in the interface between both layers is that also at the side of the reflective layer, vapour or dampness can diffuse out of the optically transparent layer into the buffer spaces, so that the vapour pressure at the interface between the optically transparent layer and the reflective layer is not or hardly increased. The forming of bubbles or blisters at the interface between both layers is therewith effectively prevented. Furthermore, the buffer spaces are preferably created such that the vapour profile, through the whole optically transparent layer as a result of the presence of the buffer spaces, remains symmetrical or at least to a large extent symmetrical, such that the creation of mechanical tensions which could lead to warping of the whole carrier structure is also prevented.

The buffer spaces are created by making cavities or excavations either in the reflective layer or in the optically transparent layer. Preferably the buffer spaces are formed by creating one or more cavities or excavations in the optically transparent layer at the side adjacent the reflective layer in the same process step in which the optical information carrier structure is also formed.

Furthermore the shape, dimensions or embodiments of the buffer spaces are preferably selected such that said buffer spaces can be distinguished optically during the read-out of the optical information carrier.

In case, for instance with a circular optical information carrier, the buffer spaces are directed radially in relation to the information structure of the carrier, optically recognizable buffer spaces can be used to divide the carrier into sectors comprising different information.

In another embodiment, the buffer spaces are created between the information tracks on the carrier in a spiral shape or a circular shape. In these cases, the buffer space can be used to control the reading or scanning light beam in relation to the information carrier along the information tracks.

These examples indicate that the buffer space or buffer spaces can form part of the optical information structure on the carrier. In another example, the information carrying structure comprises optically recognizable higher and lower parts forming piles on a flat optically transparent substrate. In that case, the spaces between the piles can form part of the buffer space or may form said buffer space itself.

It is clearly illustrated in these examples that the buffer spaces can be mutually connected. It has appeared that preferably the buffer spaces have to be mutually connected such that the pressure equalization at the interface between the optical transparent layer and the reflective layer is at a maximum.

A preferred embodiment of the optical information carrier according to the invention is characterized in that, in the optical transparent layer or in the reflective layer along the edge or edges of the information structure, an excavation is provided with a relatively high depth in relation to the buffer spaces, which excavation communicates with the buffer space(s). Depending upon the dimensions of the excavation, a significant enlargement of the buffer zone can be created in this way.

A further improvement can be realized under circumstances in case the relatively deep excavation(s) are in connection with the atmosphere. In that case a general pressure equalization is obtained at both sides of the optically transparent layer.

In case the excavation extends along the edge of the carrier, then it is preferred that near the edge of said carrier inside the excavation a supporting element (16) is installed whose thickness is equal to the depth of the excavation. The result thereof is a mechanical strengthening of the carrier, especially a stiffening of the edge of the carrier. When viewed in a direction parallel to the interface between the optical transparent layer and the reflective layer, the outer dimension of the supporting element is preferably equal to the outer dimension of the carrier, and the inner dimension is larger than the inner dimension of the excavation.

To realize the best possible vapour pressure equalization, it is preferred that said supporting element (16) be made of a vapour transmissible material, such as poly(-methyl methacrylate), polyvinyl alcohol, cellophane, cellulose acetate or a material in foamed condition, such as for instance polyurethane, polyvinyl chloride, or poly(methyl metacrylate). The supporting element can also be made of metal and contains one or more passages through which the buffer zone communicates with the atmosphere.

DESCRIPTION OF INVENTION

Further preferred embodiments, details and further advantages of the invention will be described in the following description with reference to embodiments illustrated in the attached drawings.

FIG. 1 illustrates a cross section through a part of an optical information carrier structure having multiple information structures containing small interconnecting passages mutually connected to buffer spaces according to the invention.

FIG. 2 illustrates a cross section through a part of another embodiment of an optical information carrier according to the invention having an excavation and supporting element provided along the edge of said carrier.

FIG. 3 illustrates a cross section near the edge of an audio disc or video disc containing buffer zones and excavation and support ring.

The optical information carrier 1 in FIG. 1 is assembled from an optically transparent layer 2 which, as shown in the Figure at the under side, comprises an optically readable information structure comprising a number of information tracks 7a, 7b, 7c, 7d. In a further way not indicated in detail, each track comprises alternate areas having small higher and lower surfaces and with such different physical properties that a scanning light beam (not shown) will be modulated in correspondence with the information present in the structure. From the prior art various ways are known to embody such optically readable information tracks and to realize provide said tracks in practice. The optically transparent layer 2 is closed at the under side by the reflective layer 3, for instance embodied as a metal layer which is polished at least on one side.

Between the information tracks 7a, 7b, 7c, 7d buffer spaces 4 are present, realized by means of multiple cavities or grooves made in the optically transparent layer 2. In case the part of the information carrier illustrated in FIG. 1 belongs to an information carrier with a spirally shaped information track part of which is indicated by the sections 7a, 7b, 7c, 7d, then it will be clear that in fact all the buffer spaces 4 in FIG. 1 are communicating with each other and that in fact all said spaces form a spirally-shaped groove positioned inbetween the information tracks 7. Depending upon the build-up of the information structure, connecting passages may also be present within the tracks 7a, 7b, by means of which passages the cavities 4 are directly mutually communicating.

The optically transparent layer 2 is in general made of a plastic material in which water vapour or gas can diffuse. The reflective layer 3 is in general made of a metal in which no water vapour or gas can diffuse. In case buffer spaces or the cavities 4 are omitted, then the transparent layer 2 would be closed gas-tight and watertight at one side by the reflective layer 3, with the result that at the underside no gas or water vapour can diffuse out of the transparent layer 2. Depending upon the environmental conditions, the result thereof will be a relatively high vapour pressure or gas pressure at the interface between the layers 2 and 3 which might cause a local separation between both layers and the forming of so-called blisters, small gas or vapour bubbles. As will be clear, the reading of the information tracks will be seriously disturbed by such blisters or even made impossible.

Due to the presence of the cavities 4, water vapour or gas may diffuse out of the optically transparent layer 2 at the under side. Said gas or water vapour reaches the hollow spaces 4, but the pressure increase created thereby is almost negligible and will certainly not lead to the forming of blisters.

FIG. 2 illustrates a further embodiment of an information carrier 11 according to the invention comprising an optically transparent layer 12 and a reflective layer 13. The layer 12 carries also in this case the schematically indicated information tracks 17a, 17b, . . . , each comprising alternating areas. The buffer spaces are in this case formed by means of grooves 14 in the reflective layer 13.

Along the edge of the carrier in FIG. 2, a relatively deep excavation 15 is provided in the reflective layer 13, which excavation is through transversal grooves in a not illustrated way communicating with the ends of a spirally formed groove 14 embodying the buffer space. Because of said deep excavation 15 the volume of the buffer zone as a whole, comprising the mutually communicating spaces 14, is significantly increased and the function of said buffer zone is enhanced thereby.

In this embodiment furthermore a supporting element ring 16 is installed along the edge of the disc, which ring 16 forms a structural connection between the transparent layer 12 and the reflective metal layer 13. The ring 16 is preferably made of a plastic material, such as poly(methyl methacrylate), polyvinyl alcohol, cellophane or cellulose acetate, or is made of a foamed plastic such as polyurethane, polyvinyl chloride, or poly(methyl methacrylate). In all cases, a direct vapour connection or a diffusion connection with the atmosphere is created such that an even more optimal functioning of the buffer zone created by the spaces 15 and 14 will be guaranteed. Instead thereof or as an addition, passages can be made through the ring 16 to assure a pressure equalization between the buffer zone and the atmosphere.

The result of a direct connection or a diffusion connection with the atmosphere is furthermore that the vapour pressure, especially the water vapour pressure, at both sides of the transparent layer 12 will be equal or almost equal. We have found that the diffusion of water vapour through the mutually communicating buffer zones is taking place so fast, that the vapour pressure in the whole buffer space is almost equal to the vapour pressure in the atmosphere. The development of an asymmetrical vapour pressure profile with the resulting mechanical tensions, which easily could lead to warping of the whole information carrier making said information carrier useless, is therewith prevented.

Finally, FIG. 3 illustrates a cross section taken through an embodiment of an audio or video information carrier disc similar to the embodiment in FIG. 1, which disc contains a relatively deep excavation. The disc structure 21 illustrated in FIG. 3 comprises an optically transparent layer 22, the underside of carries the information tracks 27a, 27b, 27c. Between said tracks the buffer spaces or zones 24 are created by forming grooves in the transparent layer 22 between the information tracks. The tracks 27a, 27b, 27c may consist of series of piles in the same way as is illustrated in FIG. 2, but can also be realized in another known way.

Along the edge of the information carrier structure 21 in the embodiment shown in FIG. 3, a relatively deep excavation 25 is provided in the optically transparent layer 22 communicating with the mutually interconnected buffer spaces 24. The deep excavation 25 results in a significant volume increase of the total buffer zone consisting of the mutually interconnected spaces 24, and thereby results in an enhanced functioning of said buffer zones 24.

Furthermore also in this FIG. 3 embodiment, a ring element 26 is installed along the edge of the information carrier disc 21, which ring 26 forms a connection between the carrier optically transparent layer 22 and the reflective metal layer 23. As shown in FIG. 3, the outer radial dimension of supporting ring element 26 of disc 21 is equal to the outer radial dimension of the carrier disc, and the inner radial dimension of the supporting ring element 26 is greater than the inner radial dimension of the excavation 25. Preferably again said ring 26 is made of a plastic material such as poly(methyl methacrylate), poly vinyl alcohol, cellophane or cellulose acetate, or is made of a foamed plastic such as polyurethane, polyvinyl chloride or poly(methyl methacrylate). In all cases, a direct communication vapour connection or a diffusion connection with the atmosphere is created for vapour pressure equalization, such that the optimum functioning of the buffer zone comprising the buffer spaces 25 and 24 is guaranteed. Instead of or as an addition, the ring 26 may contain passages to guarantee a pressure equalization between the buffer zones 24, 25 and the atmosphere.

With reference to preventing the forming of blisters in optical information carriers, the invention proves its advantages with all materials in which gas or vapour can diffuse. In relation to the warping effect the invention has special advantages with carriers made of plexiglass [poly(methyl methacrylate)] and, although to a lesser extent, carriers made of polycarbonate material.

I claim:

1. An optical information carrier comprising an optically transparent layer (2) and a reflective layer (3) provided adjacent to each other, wherein at the interface between said layers an optically readable information structure is provided in said optically transparent layer (2), said information structure containing alternate areas with such different properties that a scanning light beam is modulated in correspondence with information present in said structure, and wherein in the optically transparent layer (2) multiple gas-filled buffer spaces are provided at positions distributed over the interface between said layers, said buffer spaces being formed by multiple cavities formed in the optically transparent layer (2) adjacent to the reflective layer (3) and extending into areas intermediate between tracks of the information structure, said buffer spaces being directly mutually interconnected by passageways existing within the information tracks, so as to provide pressure and vapor equalization between adjacent buffer spaces of the optical information carrier, wherein the information structure comprises circular, radially or spirally extending information tracks onto a circular optically transparent layer of said optically transparent layer, and the buffer spaces are provided by respective circular, radially or spirally extending cavities and within the information tracks provided in the optically transparent layer.

2. An optical information carrier according to claim 1, wherein the optically transparent layer is made of a plastic material in which water vapor can be diffused, and the reflective layer is made of metal.

3. An optical information carrier according to claim 1, wherein the shape and dimensions of the buffer spaces are selected so that they can be optically distinguished from the information structure.

4. An optical information carrier according to claim 1, wherein the optically readable information structure comprises higher and lower parts, whereby the spaces present between the lower parts of said information structure and said reflective layer form at least part of the buffer spaces.

5. An optical information carrier according to claim 1, wherein the information carrier structure includes a plurality of piles extending from said optically transparent layer towards said reflective layer, so as to provide said plurality of direct interconnecting passageways between said adjacent buffer spaces.

6. An optical information carrier having interconnected buffer spaces provided for maintaining a flat shape, said carrier comprising an optically transparent layer (2) and a reflective layer (3) provided adjacent to each other, wherein at the interface between said layers an optically readable information structure is provided in said optically transparent layer, said information structure containing alternate areas having higher and lower parts with such different properties that a scanning light beam is modulated in correspondence with the information present in said structure, and wherein multiple gas filled adjacent buffer spaces are provided in the optically transparent layer (2) adjacent the reflective layer (3) at positions distributed over the interface between said layers, said buffer spaces extending into areas intermediate between tracks of the information structure and being mutually directly interconnected by multiple passageways formed by a plurality of higher and lower parts which extend from said optically transparent layer towards said reflective layer within the information tracks, so as to provide pressure and vapor equalization between the adjacent buffer spaces and prevent local stress and distortion in the optical information carrier, wherein the information structure comprises circular, radially or spirally extending information tracks onto a circular optically transparent layer of said optically transparent layer, and the buffer spaces are provided by respective circular, radially or spirally extending cavities and within the information tracks provided in the optically transparent layer.

* * * * *